Patented Nov. 10, 1936

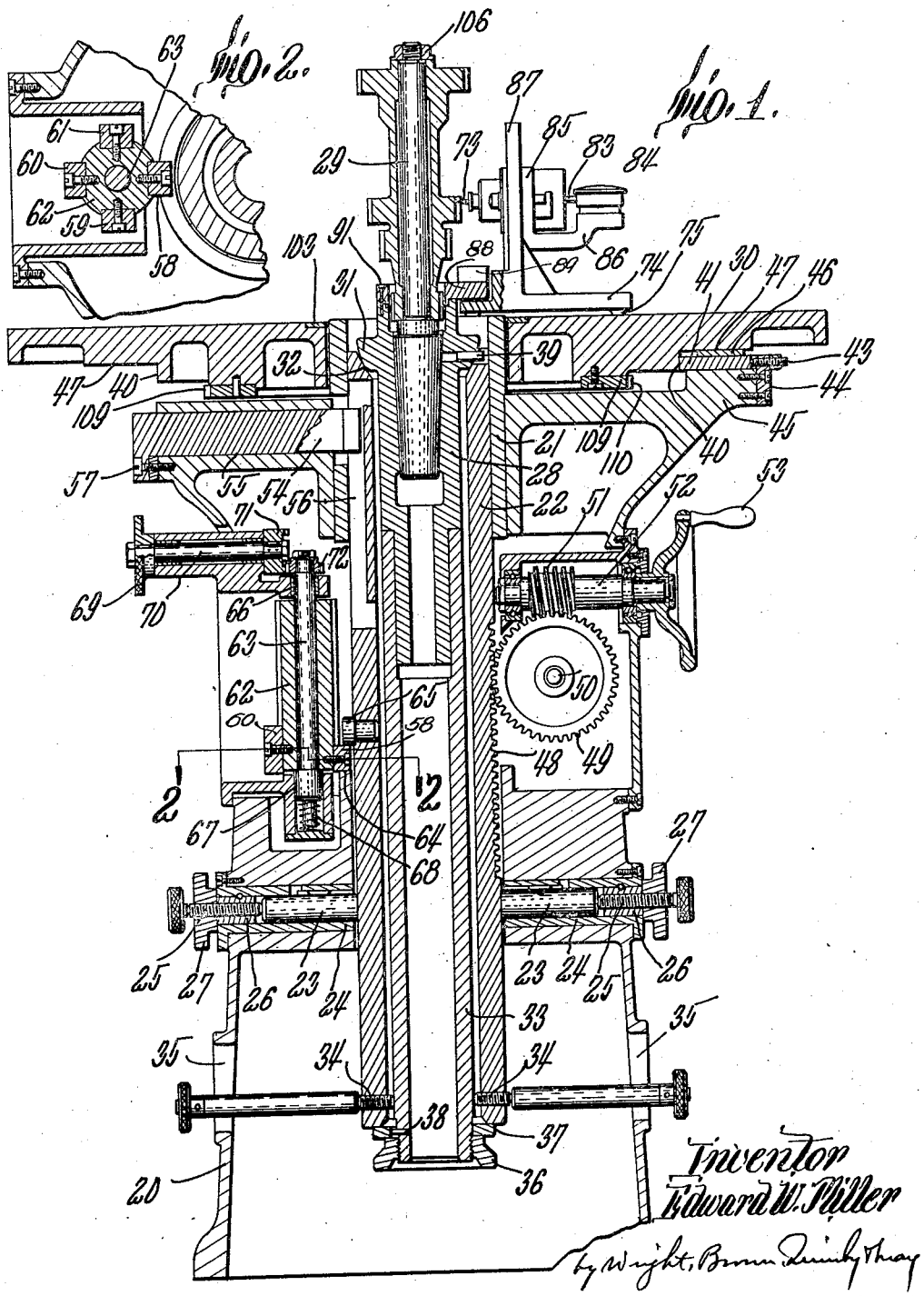

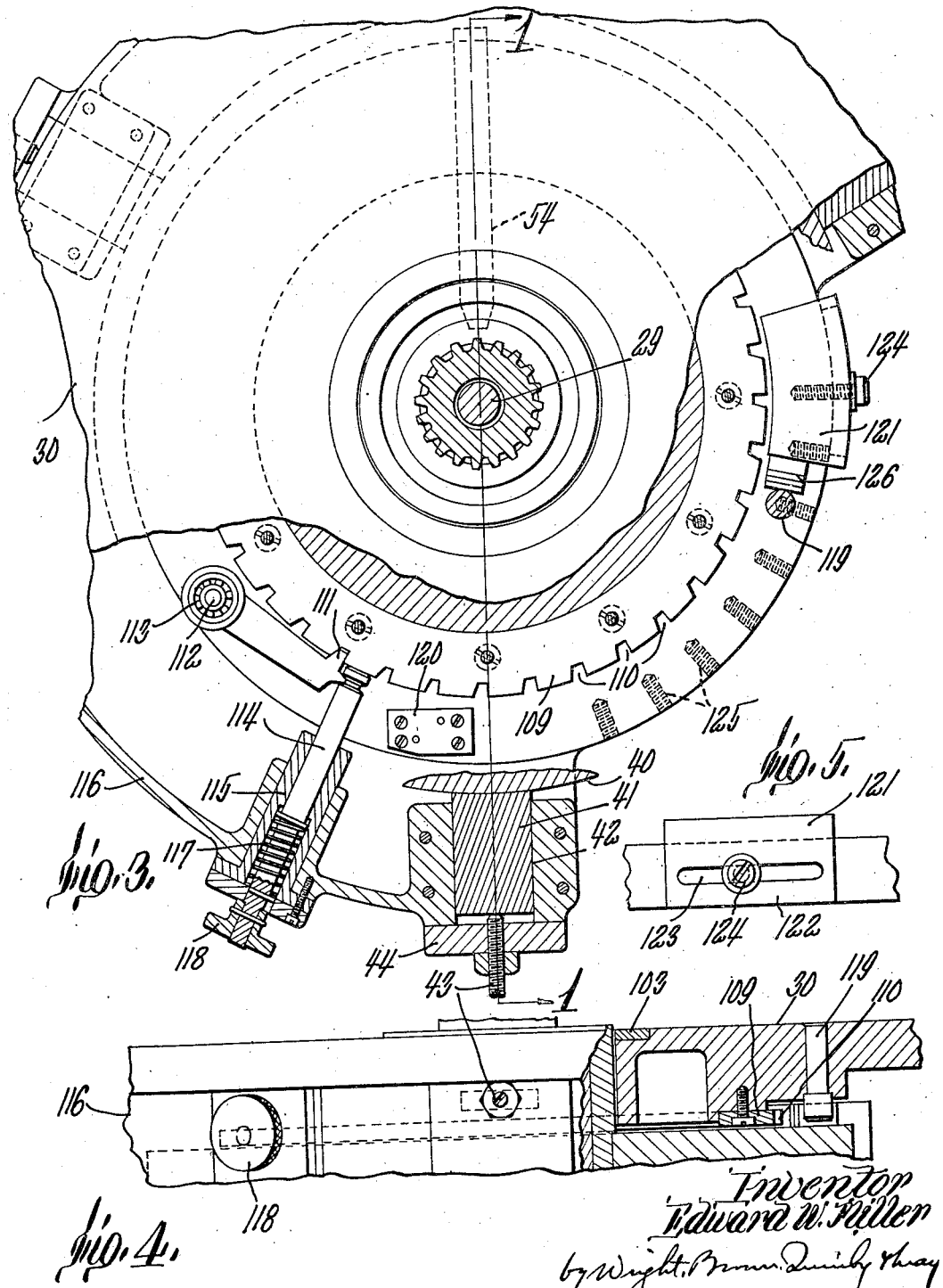

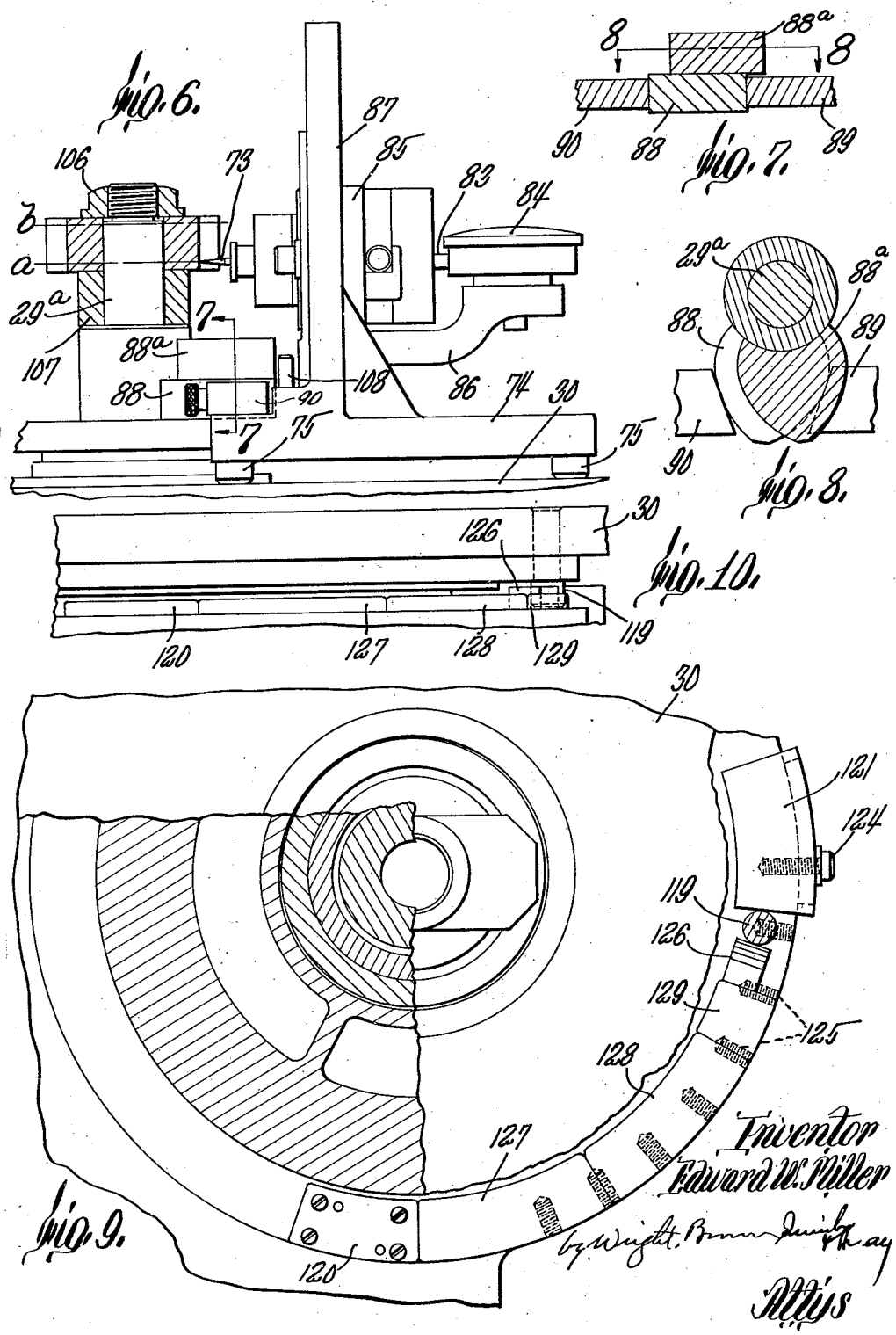

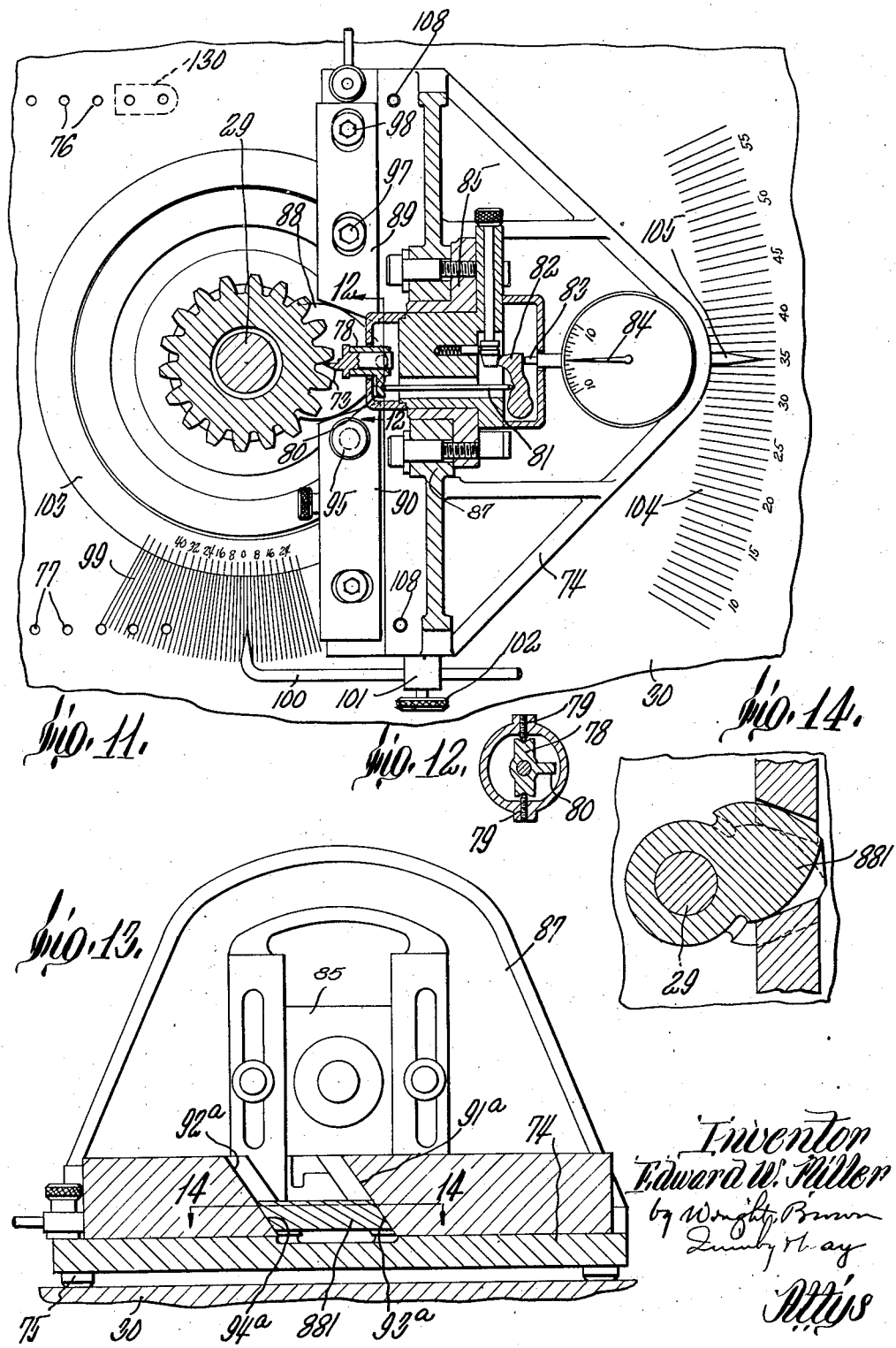

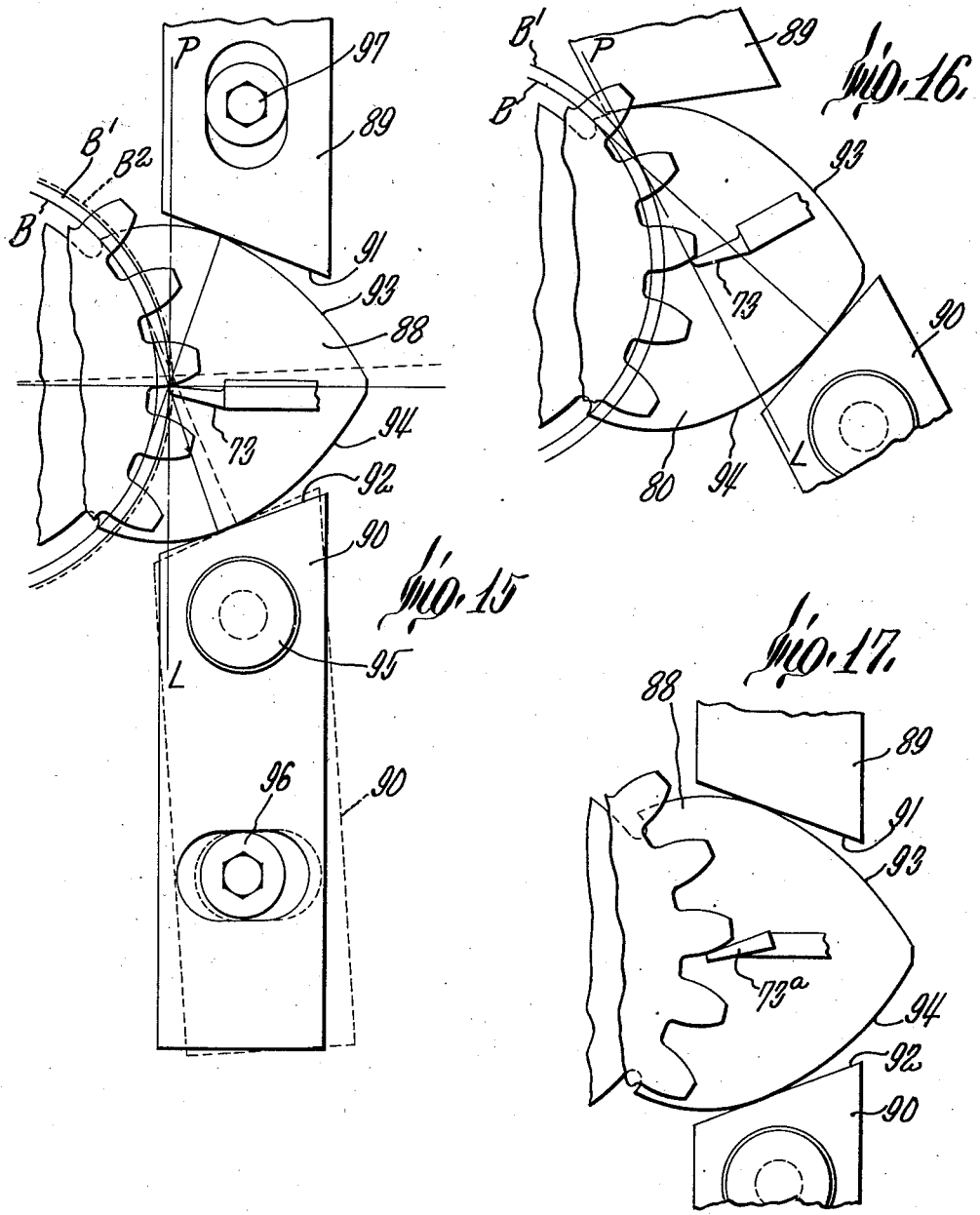

2,060,518

UNITED STATES PATENT OFFICE 2,060,518

MACHINE FOR MEASURING GEARS AND HELICAL LEADS

Edward W. Miller, Springfield, Vt., assignor to The Fellows Gear Shaper Company, Springfield, Vt., a corporation of Vermont Application November 25, 1933, Serial No. 699,727

40 Claims. (Cl. 33—174)

The present invention has for its object to provide a simple, easily operated, and extremely accurate means for testing the accuracy of, and measuring errors in, the face curves of gear teeth, whether spur or helical, the helix angle or lead of helical gears and other helicoidal surfaces, and other characeristics of gears. It includes in its practical embodiments herein illustrated suitable means for mounting and positioning a gear to be tested, a table supporting a freely movable carriage equipped with a feeler member and an indicator, means for limiting the movements of such carriage to a definite path related to the tooth form of such gear, when rocked about the axis of the gear, means for measuring or indicating the angle through which the carriage is turned when traversing such path, and provisions for rotating the table and measuring its angular movements with exactness. A variety of specifically different means are available for determining or regulating the angular movements of the table, relatively to the gear being tested, and of the carriage relatively to the table, illustrative embodiments of which are shown in the drawings. In this machine the gear or other piece to be tested is withheld from rotation, but is movable in the axial direction and is located in exactly determined positions by means which constitute one of the features of this invention.

In the present illustrative drawings,—

Fig. 1 is a vertical central section of a machine embodying the invention, the plane on which the section is taken being indicated by line 1—1 in Fig. 3;

Fig. 2 is a horizontal section of a detail of the machine taken on line 2—2 of Fig. 1;

Fig. 3 is a fragmentary plan view and partial section of the machine showing one of the means for determining angular movements of the table;

Fig. 4 is a partial elevation and partial section of the table and adjacent parts shown in Fig. 3;

Fig. 5 is an elevation of a detail of the machine as seen from the right of Fig. 3;

Fig. 6 is an elevation of the carriage and its measuring instruments in association with a gear to be tested; and one of the alternative means for measuring the helical lead of a gear and the tooth formation of the gear in different planes;

Fig. 7 is a detail sectional view on line 7—7 of Fig. 6, showing in detail the so-called former illustrated in Fig. 6 for the designated purposes;

Fig. 8 is a horizontal section of said former taken on line 8—8 of Fig. 7;

Fig. 9 is a plan view and partial section of the table showing means alternative to that illustrated in Figs. 3 and 4 for measuring and limiting angular movements of the table, Fig. 10 is a partial side elevation of the means illustrated in Fig. 9;

Fig. 11 is a horizontal section and plan view of the movable carriage and indicating means by which gear tooth forms are tested, shown as resting on the table of the machine in cooperation with a gear;

Fig. 12 is a sectional view of a detail of this mechanism taken on line 12—12 of Fig. 11;

Fig. 13 is a sectional elevation of the carriage showing an embodiment of former and former bars alternative to those shown in the preceding figures;

Fig. 14 is a horizontal sectional detail view taken on line 14—14 of Fig. 13;

Figs. 15 and 16 are diagrammatic views illustrating the manner in which the tooth form testing feature of the machine performs its function;

Fig. 17 is a view similar to Fig. 15 showing an alternative design of pointer or feeler.

Like reference characters designate the same parts wherever they occur in all the figures.

Referring to Fig. 1, the machine base consists of a hollow column or pedestal 20, in the upper part of which a bushing 21 is fitted and tightly held. This bushing provides the upper bearing for an elongated carrier 22 by which gears and other articles or specimens to be tested are supported and held. Such carrier is in the form of a hollow bar and is called for convenience a work spindle, although its only movement is longitudinal and it is withheld from rotation. It has a close sliding fit in the bushing 21. There is also a lower bearing for this spindle, adjustable horizontally in order to bring it into exact vertical alinement with the passageway through the bushing 21. Such lower bearing consists of four plungers 23 spaced equally around the spindle and movable endwise in horizontal guides 24 in the machine base. They are so adjusted by individual adjusting screws 25 contained in threaded bushings 26 secured in the outer ends of the respective guideways, which screws are locked by lock nuts 27.

The spindle 22 contains an adapter 28 in which is mounted friction tight, but removably, an arbor 29 for mounting the gears and other articles to be tested. The arbor shown in Fig. 1 is interchangeable with others, such for instance as that shown at 29a in Fig. 6, according to the character of the test specimens.

A table 30 is supported on the top of the column, in a manner which will be later described in detail, so that it is horizontal, and its upper surface is carefully scraped and finished to the nearest practicable approximation to a true plane. In order that the arbor 29 may be accurately set to an angle of 90° with the plane of the table, which is necessary for making measurements to the required degree of precision, the arbor adapter 28 is made adjustable within the spindle 22. For that purpose the adapter is provided with a flange 31 which has a spherical external surface resting on a tapered seat 32 in the upper end of the spindle. The lower part of the adapter enters the spindle and is provided with a rigidly connected extension bar 33, this bar and the adjacent part of the adapter being both considerably smaller in horizontal dimensions than the interior of the spindle and having a clearance on all sides. Four adjusting screws 34 are threaded through the sides of the spindle near its lower end in position to bear against the extension bar of the pendent adapter at points equally spaced around the axis of the spindle. The shanks of these screws pass through slots 35 in the sides of the column for convenience of access for manipulation. By their use the adapter may be adjusted about the center of its seating face on the spindle until the arbor is exactly perpendicular to the surface of the table. The slots 35 are extended vertically to permit movement of the adjusting screws 34 with the spindle when the latter is displaced endwise. A lock nut 36 is screwed on the end of the extension bar 33 which protrudes from the lower end of the spindle, and forces a washer 37 against the spindle to anchor the adapter extension in the adjusted position. A key 38 mounted in the extension prevents rotation of the washer; while the adapter is prevented from rotating in the spindle by means of a key 39 protruding from flange 31 into a notch in the spindle.

The table 30 is adjustable horizontally to centralize its axis of rotation exactly with the axis of the arbor. It surrounds the upper end of bushing 21, but with enough clearance to permit adjustments within the small range necessary and sufficient for the purpose. In its lower part it is formed with a cylindrical bearing surface 40 engaged by three bearing shoes 41 supported in guideways 42, (see Fig. 3), at the top of the column. By means of screws 43 which are threaded through cap plates 44 crossing the ends of these guideways, the bearing shoes may be separately adjusted to bring the surface 40 exactly concentric with the arbor. These shoes 41 are spaced equidistantly around the axis of the machine.

The guideways 42 for the bearing shoes are located in bracket-like portions 45 of the column, which rise above the top of the main part of the column. Cover plates 46 are secured to these brackets over the guideways and bearing shoes, and they support the table. Their upper faces are finished to smoothness and are located all in the same plane perpendicular to the axis of the machine, and are engaged by a plane smooth thrust bearing surface 47 of the table which is parallel to the top surface thereof.

By means of the adjustments herein described for the spindle, the arbor adapter, and the table, these parts may be placed in the required positions of alinement, concentricity and perpendicularity quickly by a skilled operator, and with a quality of accuracy transcending the accuracy of machines available for turning and boring fixed bearings for these parts. It is to be understood of course that the precise number of adjusting screws 34 and of the bearing shoes 23 and 41 is not important provided only that these or equivalent adjustments are suitably arranged and organized to obtain the desired results.

In the testing of helical leads, it is necessary to shift the spindle endwise in order to bring axially separated points of the helix to the level of the measuring instrument mounted on the table. Therefore the spindle is provided with a longitudinal series of rack teeth 48 with which a gear 49 meshes. The gear is mounted on an axle stud 50 and is rotated by a worm 51 on a shaft 52, the outer end of which carries a crank 53. Rotation of the spindle is prevented by a massive key 54 contained slidingly in a guideway 55 and having a tapered inner end which enters a complementally tapered groove or keyway 56 in the side of the spindle. A screw 57 passes through a lug on the key into a tapped hole in the column and serves to secure the key in place and also to compensate for wear between the key and keyway.

Gauge blocks of known height within minute limits of error are preferably employed to determine and measure the distances between different settings of the spindle in the axial direction. One feature of the invention resides in a means for carrying a number of such gauge blocks and bringing them successively into position. Figs. 1 and 2 show gauge blocks 58, 59, 60, and 61 secured to different sides of a bar 62 which is secured coaxially on an upright shaft 63. By turning the shaft any one of the gauge blocks may be placed between a seat 64 on the base and an abutment stud 65 which protrudes from the adjacent side of the spindle above the seat. Shaft 63 is movable endwise a slight distance in its bearings 66 and 67 and rests on a spring 68 in the lower bearing, which spring is strong enough to lift the assemblage of gauge blocks and carrier clear of the seat 64, so that the blocks will not strike the seat in being passed over it. But the spring yields when stud 65 is pressed down on top of any of the blocks, permitting the block which is then beneath the stud to rest and bear on the seat. Rotation of the block carrier shaft 63 is caused by a knob or handle 69 on a shaft 70 which is coupled to shaft 63 by a crown gear 71 and pinion 72. Any number of such gauge blocks, limited only by the permissible size of the holder 62 and requirements of clearance, may be provided according to the same principle; and any one or two of those here shown may be omitted.

The measurements of gears and other test specimens are made by means of a feeler or pointer 73 which preferably is coupled with an indicator through multiplying mechanism so as to show the movements of the feeler on an enlarged scale. Various feelers movable in different ways and connected variously to the multiplying indicator may be used for taking different measurements; for instance, the form of gear tooth faces, the circular pitch and eccentricity of gears, the lead of helical gears and other helicoidal surfaces, etc. In the present illustration I have shown only a pointer or feeler which is adapted to measure tooth face curves and helical leads. Such feeler is mounted on a carriage 74 which has three feet 75 resting on the upper surface of the table and is movable freely in all directions over such surface; or it may be made fast to the table by clamps passed through selected ones of two series of holes 76 and 77, (see Fig. 11). The particular feeler shown is adapted to enter between the teeth of a gear and to bear on the side of one of such teeth, and is movable laterally (in a plane perpendicular to the axis of the gear) and tangentially of the pitch circle of the gear, relatively to the carriage. It is reversibly mounted in a tubular holder 78 which turns on a vertical axis between pivot screws 79 and has an arm 80 which transmits motion through a rod 81 and lever 82 to a plunger 83 which operates the pointer 84 of an indicator instrument with multiplying effect. The instrument here shown is one of well known character which measures over a scale in terms of ten-thousandths of an inch. Any other suitable indicator may be used. The pointer and transmission mechanism are enclosed in a casing which is mounted on a slide 85 having a bracket 86 which supports the indicator instrument and being adjustable on an upright 87 of the carriage 74.

When testing the truth of gear tooth faces the carriage is moved over the face of the table with a movement as though it were rolled about the pitch circle of the gear. It is constrained to travel in this manner under the pressure applied by the operator's hands, by a member 88, which I call a former, and cooperating abutments 89 and 90, which I call former bars. The former is secured to the work spindle by suitable means as, for instance, by a screw 91, shown in Fig. 1, passing into the work arbor adapter. When testing involute gears the former is most conveniently and preferably made with side faces which are involutes generated from a base circle B (Figs. 15 and 16) of smaller diameter than the base circle B' of the test gear. The abutments or former bars 89 and 90 are secured to the carriage and are spaced apart to receive the former between them. They have plane contact faces 91 and 92 which engage the faces 93 and 94 respectively of the former and form in effect the opposite sides of a rack tooth space conjugate to a gear of which the former may be considered as constituting one tooth. The former is much larger than any tooth of the test gear, and its sides carry the involute curves farther from its base circle than the gear teeth extend from their base circle, all of which conduces to accuracy of construction and operation.

It results from having the base circle B of the former smaller than the base circle B' of the gear, that the carriage when turned under the guidance of its former bars, rocks about the circle B' as a pitch circle, which is of advantage in that the wear on the abutment faces 91 and 92 is distributed. In order to achieve this effect the faces 91 and 92 of the former bars are inclined conformably to a pressure angle of which the cosine is equal to the ratio between the radii of the circles B and B'. I find it of advantage to mount the former bars adjustably so as to alter the pressure angle. Thus in the present illustration the bar 90 is adjustable about the stud 95 which connects it near one end to the carriage, and it is secured in different adjustments by a clamp screw 96 which passes through a countersunk slot in the bar into a tapped hole in the carriage. Hence, when the bar 90 is placed in the dotted line positon shown in Fig. 15, the angle between the two contact faces is so altered as to cause the guided rolling movement of the carriage around the work spindle to take place on a different pitch circle $B^2$, shown by dotted lines in Fig. 15. By virtue of this, or any equivalent, adjustment the same former is made available for use with gears of which the base circles differ from one another through a considerable range.

Also one of the former bars is adjustable toward and away from the other, in order to take up backlash and wear and to accommodate formers of different widths and to control the distance of the carriage as a whole from the axis of the work spindle when in the measuring position. In this illustration the bar 89 is made thus adjustable, by having longitudinal slots through which the clamp screws 97 and 98 pass into the carriage base. It is within my contemplation to have either or both of the bars adjustable either longitudinally or angularly, or both longitudinally and angularly; although the arrangement shown, where one is adjustable longitudinally only, and the other angularly only, is sufficient for most purposes.

The table is conveniently provided with angular graduations 99 radial to the work spindle, with which cooperates a pointer 100 passing through a lug 101 on the carriage and secured by a set screw 102 with capacity for adjustment. The pointer measures the angle through which the carriage swings while the feeler finger traverses the face of a gear tooth from the base circle of the gear to the extremity of the tooth, or vice versa. An adjustable ring 103 is set into a concentric recess in the center of the table and is provided with a scale of angular degrees which may be placed, by appropriate rotation of the ring, in register with any selected ones of the graduations 99. This ring serves to place the zero of the scale beside whatever graduation may cooperate most favorably with the pointer 100 as the zero graduation when the feeler is at the starting point.

There is another series of angular graduations 104 on the table and a pointer 105 on the carriage, which may be used for like purposes if desired.

In testing a gear, a former related to the gear in accordance with the principles therein explained is first secured to the spindle adapter (it being assumed that the adapter has previously been alined and the table 30 centered with respect to it as previously described), and a gear to be tested is placed on the arbor and secured by clamp screw 106. Any unit of a cluster gear may be tested by using an arbor of the type shown in Fig. 1, and other gears by using an arbor of the kind shown in Fig. 6, with the aid of one or more spacing collars 107 if necessary; and the indicator instrument is adjusted to the proper height in the carriage. The first tooth to be tested need not be accurately alined radially with respect to the former, for the movable ring 103 (which may be called for convenience the zero ring), compensates for a considerable latitude in placement of this tooth. The carriage is rotated with its former bars in contact with the former until the feeler is at the origin of the tooth face curve, (the intersection of this curve with the base circle B'). This point is readily determined by swinging the carriage until the feeler, in approaching the root of the tooth, makes a decided movement. Then, with the feeler at the point of origin, the pointer 100 and the zero mark on the scale on ring 103 are adjusted to the same one of the graduations 99, far enough removed from the end of the series to assure that the pointer will not run beyond the graduations when the feeler is carried to the point of the tooth. In testing each tooth thereafter, the carriage is brought back to the same starting point and the gear is indexed to bring another tooth into contact with the feeler. The operator rocks the carriage by hand, sliding it over the surface of the table while holding its abutments in firm contact with the former. In thus rocking from the position of Fig. 15 to that of Fig. 16, the pitch line PL of the master rack provided by the former bars rolls on the base circle B' of the gear and the feeler is carried in an involute path from the point of origin to the extremity of the tooth. Any departures from truth of the tooth face are measured with mutiple effect by the indicator 84, which shows both the amount and direction of such errors. The graduations 99 not only measure the extent through which the feeler travels, but they also identify the points in the tooth at which errors occur. When the teeth have been measured on one side, the feeler mechanism may be rotated in the slide 85 to measure the opposite side of the teeth; the measurement of which is carried out in the same manner but by rocking the carriage in the opposite direction.

If the contacting faces of the former and the abutment bars are perpendicular to the table, (i. e., their surface elements are parallel to the axis of the gear being tested), the test may be carried out in any plane perpendicular to the axis of the gear, by raising or lowering the work spindle. When the gear being tested is helical, the helix angle or lead of its teeth may be tested also. One means for thus testing the lead is shown in Figs. 6, 7, and 8, consisting in the use of two formers 88 and 88a, which are exactly alike and both contain the principles of the former first illustrated, but are displaced angularly from one another by an angle equal to that between corresponding points at a given axial distance apart on the gear tooth. Suppose, for instance, that the lead of the helical gear is 20° per inch of length in the axial direction. In that case the formers 88 and 88a are arranged at an angle of 20° with one another and are of such thickness that either exclusively may be brought into engagement with the bars by raising or lowering the spindle a distance of one inch. Thus, referring to Fig. 6, the former 88 may be used to test the gear teeth in the zone a, and the former 88a to test the teeth in zone b. Properly selected gauges 58 and 60 enable the gear to be set so that zones exactly one inch apart (or whatever other distance may be prescribed for the lead of an angle of prescribed value) may be brought to the height of the feeler.

An alternative form of former and abutments is shown in Figs. 13 and 14, in which the former 88I has helicoidal contact faces 93a and 94a of the correct lead prescribed for the gear teeth, and the former bars have correspondingly inclined abutment faces 91a and 92a. By means of these inclined contact faces, the carriage is constrained to take a position of partial revolution about the axis of the gear with any change in the height of the latter, and through an angle proportional to the axial displacement. The indicator means are therefore enabled to test the form and lead of the gear teeth in any position between the ends of the gear.

A further mode of measuring helical leads, not only those of helical gears but of any other helicoidal surfaces, is by turning the table and noting the angle through which it is turned, in conjunction with a measured axial movement of the work piece. With this mode of measurement the carriage turns with the table, and it may be placed on some part of the table where it is clear of the former, or the former may be removed or loosened. In order to retain the carriage immovably on the table in such circumstances, it may be equipped with a pin or pins 108 adapted to enter selected ones of the holes 76 and 77.

Measurement of the angle through which the table is turned may be effected in a variety of ways. In Figs. 3 and 4 I have shown a ring 109 secured to the under side of the table, concentrically therewith, in a recess below the upper sides of the brackets 45, and having notches 110 in its outer circumference, any one of which may be entered by a locking dog 111. The sides of these notches and of the dog are convergent so as to engage without backlash when the dog is pushed in as far as it will go. The dog is pivoted by a fixed stud 112 and ballbearing 113 to the machine base and is coupled to a plunger 114 which slides radially in a guide bushing 115 mounted in a flange 116 of the machine base which extends between two of the brackets 45. The plunger or rod 114 is pressed inward by a spring 117 and carries an external knob 118 by which it may be pulled out to disengage the dog from the ring. The notches are spaced at given distances apart. In the present illustration the spacing of each from the next is 10°, and they are located and cut within limits of error less than one ten-thousandth of an inch. While I do not limit the invention in any way as to the degree of accuracy in this part of the machine, I have mentioned this specific order of accuracy in order to make it clear that highly accurate conditions may be secured in commercial practice. Angles other than those between a whole number of notches are measured, and their limits set, by a stop pin or the like 119 carried by the table on its under side, and stationary stops on the top of the base. One of such fixed stops is shown at 120 and is fixed in a normally permanent way to the base. The other stop 121 is displaceable and adjustable. It rests on the top surface of the base and has a flange 122 overlapping the adjacent side of the base and slotted at 123 to admit a clamp screw 124, or a plurality of such screws, insertable interchangeably in any one of a series of tapped holes 125 in the adjacent part of the base.

The fixed stop 120 is located so that when stop 119 is placed against it, one of the notches 110 is in position to be entered by the locking dog. The shiftable stop may be located by placing it against the movable stop when the latter has been turned through the angle subtended by any given number of notches. Setting of the adjustable stop to angles intermediate those measured by the notches is effected by placing sine blocks 126 against the stop 119 and adjusting the stop 121 against them. In order to place this latter stop so that the table may swing between a limited angle of say 76°, the table is turned through the angle of seven notches (amounting to 70°) from the position where the stop pin 119 contacts with stop 120, and is locked by the dog. Then gauge blocks 126 of a total thickness equal to the sine of 6° multiplied by the distance of the center of pin 119 from the center of rotation of the table are placed between this pin and the stop 121, and the latter is moved up against the gauge blocks and clamped. Removal of the gauge blocks then leaves a space between the stops 120 and 121 permitting to the table a turning movement of 76°. Other angles may be measured off in the same way with location of the clamp screw 124 in the appropriate hole 125 and the use of appropriate gauge blocks 126. With the aid of a set of Johansen blocks any angle may be easily and quickly established in this manner. Gauge blocks may also be placed against the fixed stop 120 for establishing an opposite limit of swing in a given angle, without the use of a notched index ring or plate such as ring 109; for instance, in the manner illustrated in Fig. 9. In this case blocks 127, 128, 129, etc., subtending definite angles, are placed in series against the stop 120 and against one another, and sine gauge blocks 126 are built up to any desired distance beyond the last of these angle blocks. It may be observed that the angle blocks are concentric with the part of the base on which they rest, and have radial ends, while the sine gauge blocks have parallel faces. The table-carried stop pin 119 is brought against the outermost sine block and the adjustable gauge 121 is placed against the outer side of this pin and made fast, after which the blocks are all removed, leaving a clear space between the stop 120 and 121 in which the stop pin can swing through a definitely limited angle.

Having thus described the main characteristics of the invention, I wish to make it clear that the same machine may be used for other purposes also besides those named; as for measuring the circular pitch of the gear teeth, eccentricity of the gear, etc. When the carriage is required to be placed in the same position in making successive measurements, as, for instance, when measuring the circular pitch of gear teeth, it may be pivoted to the table by one of the studs 108 which permits it to be withdrawn when the gear is indexed, or the table turned about its axis, between successive measurements, and located again in the measuring position by the aid of a stop 130, shown by dotted lines in Fig. 11. The carriage would then be located at the opposite side of the test specimen from the position shown in that figure.

Fig. 17 shows illustratively a different form of feeler from that shown in the other figures. This alternative feeler, 73a, has a contact face like that of a rack tooth and its plane may be inclined to the plane of the table when made for testing helical gears. Or its contact face may be a mere edge. The feeler 73, shown in the other figures, has its engaging point at its extremity.

Various modifications and rearrangements of the elements and combinations herein disclosed may be made within the scope of the invention which I desire to protect. The principles of this invention are not limited to the specific embodiments chosen for ilustration herein. Neither are these principles limited to the testing of the particular types of article or specimen previously mentioned, nor, when applied to test gear teeth curves, are they limited to involute gears as distinguished from those of other systems. By using the involute type of former and mating abutments, but a feeler having a contact surface corresponding to the basic rack tooth of another type of gearing, such as the cycloidal, the truth of a conjugate epicycloidal gear may be tested and its aberrations measured. So also formers of other types than involute, and abutments of conjugate rack contours, may be used in a similar way as a standard of comparison for testing gears of the same type as the former and abutment.

The disclosure of this application is essentially the same as that of my preceding application Serial No. 631,604, filed September 3, 1932, but contains also certain further developments and improvements thereover. As to all common subject matter it is a continuation of said prior application.

What I claim and desire to secure by Letters Patent is:

1. A machine for testing and measuring the tooth faces of gears and the lead of helical gears and other helicoidal surfaces, comprising supporting structure, a holder for the article to be measured mounted on the supporting structure, a feeler adapted to be placed in contact with a surface of such article, a carrier for the feeler movable bodily on the supporting structure around the article being measured, and with respect to which the feeler is independently movable, and means engaged with the supporting structure and the article holder for effecting a relative axial displacement between the article and the feeler whereby to bring the feeler into measuring relationship with axially separated zones of the article.

2. A machine for testing and measuring the tooth faces of gears and the lead of helical gears and other helicoidal surfaces, comprising supporting structure, a holder for the article to be measured mounted on the supporting structure, a feeler adapted to be placed in contact with a surface of such article, a carrier for the feeler movable bodily on the supporting structure around the article being measured, and with respect to which the feeler is independently movable, means reacting between the supporting structure and article holder for effecting a relative axial displacement between the article and the feeler, and measuring means on the supporting structure for respectively measuring the extent of such axial displacement, and the angular displacement of the feeler carrier around the axis of the helix being measured.

3. A machine for testing and measuring the tooth faces of gears and the lead of helical gears and other helicoidal surfaces, comprising supporting structure, a holder for the article to be measured mounted on the supporting structure, a feeler adapted to be placed in contact with a surface of such article, a carrier for the feeler movable bodily on the supporting structure around the article being measured, and with respect to which the feeler is independently movable, means reacting between the supporting structure and article holder for effecting a relative axial displacement between the article and the feeler, and measuring means cooperative with said carrier and feeler for showing variation between the actual helical lead of the article being measured and a prescribed lead in the axial distance from one to another of such zones.

4. A machine for testing and measuring the tooth faces of gears and the lead of helical gears and other helicoidal surfaces, comprising supporting structure, a holder for the article to be measured mounted on the supporting structure, a feeler adapted to be placed in contact with a surface of such article, a carrier for the feeler movable bodily on the supporting structure around the article being measured, and with respect to which the feeler is independently movable, means reacting between the supporting structure and article holder for effecting a relative axial displacement between the article and the feeler, means on the supporting structure for measuring the extent of such displacement, means on the supporting structure for measuring the angular displacement of the feeler carrier, and means on the carrier for measuring the displacement of the feeler relatively to said carrier.

5. A machine for testing and measuring the tooth faces and lead of helical gears, comprising a holder for the gear, a support contiguous to said holder having a supporting surface prependicular to the axis of the gear placed on such holder, a carriage movable on said supporting surface angularly about said axis, a feeler mounted on said carrier protruding therefrom into position to engage a tooth face of the gear and being movable relatively to the carrier in a plane parallel to such supporting surface, in directions generally tangential to a circle concentric with said axis, means reacting between the supporting structure and article holder for effecting relative axial displacement between the gear holder and said support, complemental guiding means comprising contacting parts connected with the gear holder and said carrier respectively, constructed to cause the movement of the feeler to take place in a prescribed path when the carrier is rocked angularly around said axis; that part of said guiding means which is carried by the gear holder being also constructed to cause displacement of such path angularly around said axis when the carrier-connected portion of the guiding means is engaged therewith in respectively different positions of such angular displacement.

6. A machine for measuring aberrations in the tooth faces of a gear, comprising a holder for such gear, a support contiguous to said holder, a carrier resting on said support and being movable freely over the surface thereof, guiding means comprising a tooth element connected to the gear holder and conjugate rack elements secured to the carrier, coooperable to guide the carrier when the latter is rocked about the axis of the gear holder with its rack elements in embracing contact with said tooth element, and a feeler mounted on the carrier adapted to bear on the side of a gear tooth connected to the holder and having provision for movement relatively to the carrier in directions toward and away from the radial center line of such tooth.

7. In a gear measuring machine, the combination with supporting structure of a former corresponding to an involute gear tooth mounted on the supporting structure, a carriage resting and movable on the supporting structure and having abutments flanking said former with contact faces corresponding to the adjacent sides of conjugate rack teeth, a feeler mounted on the carriage with provision for movement relatively thereto in a plane parallel to the plane wherein the carriage is movable, having a surface corresponding to the basic rack tooth face of a definite system of gearing adapted to bear on the face of a tooth of a gear of the same system when such gear is mounted coaxially of the base circle of the former, and means for indicating displacements of the feeler relatively to the carriage in directions transverse to the axis of the gear being tested.

8. A machine for testing gears comprising supporting structure, a former corresponding to the tooth of a gear coaxial with the gear to be tested mounted on the supporting structure, a carriage freely movable on the supporting structure with respect to said former and having abutments corresponding to the adjacent faces of neighboring teeth of a rack conjugate to said former, said abutments engaging the faces of the former and constraining the carriage to move in a path corresponding to that of a rack rocked about the pitch circle of a mating gear, when moving force is exerted on the carriage with components radial and tangential to the gear to be tested, and means mounted on the carriage engageable with the gear to be tested and adapted to measure departures of the gear tooth face from a form corresponding to that of the former.

9. A machine for measuring aberrations in the tooth faces of a gear comprising a holder for such gear, a former having faces similar to those of a correct standard gear tooth mounted coaxially with the gear being tested, a supporting table adjacent to said holder and former, a carriage resting on said table and movable freely over the surface thereof and having abutments flanking said former and corresponding to the opposite sides of a rack tooth space conjugate to the former, a feeler supported by said carriage and arranged to bear on the face of the gear tooth being tested with freedom for movements laterally relatively to the carriage, and an indicator associated with said feeler and operable thereby to show the direction and extent of such relative lateral movements thereof.

10. A gear testing machine comprising an arbor adapted to hold the gear to be tested, a former secured in a prescribed relationship to said arbor having opposite faces which are involutes of a circle coaxial with said arbor, a table adjacent and substantially perpendicular to the arbor, a carriage resting on said table with freedom for movements bodily thereover, former bars or abutments secured to said carriage and having faces corresponding to the sides of a tooth space in an involute rack arranged to embrace said former and engage the involute faces thereof, a feeler mounted on said carriage in position to bear on the face of a gear tooth being tested and having provision for lateral displacement to right or left relatively to the carriage in consequence of aberrations from correct form of the gear tooth, when passed across the face of said tooth with rocking movements of the carriage, and means for measuring and indicating the direction and extent of such relative displacements of the feeler.

11. A gear measuring machine comprising a table having a supporting surface, a carriage resting on said surface and movable bodily thereover, a spindle adjacent and transversely mounted with respect to said table to support a gear to be tested, a former having faces which are involute curves generated from a base circle of smaller diameter than that of a gear to be tested mounted relatively to said spindle with its base circle coaxial with such gear, former bars secured to said carriage embracing and abutting against the opposite faces of the former and having abutment faces disposed correspondingly to the faces of a rack tooth space conjugate to the former on a pitch circle coincident with the base circle of the gear to be tested, a feeler mounted on said carriage in position to bear on the face of a tooth of such gear at the point of intersection between such face and the pitch line of the abutments, said feeler being displaceable laterally relatively to the carriage, and means for measuring the amounts of its displacement in either direction.

12. A machine for testing the face curves of involute gears and measuring the aberrations thereof, comprising supporting structure, a stationary holder for the gear to be tested mounted on the supporting structure, a carriage mounted on the supporting structure so as to be freely movable both translatively and angularly with respect to said gear, a feeler mounted on said carriage and having provisions for movement relatively thereto transversely to the face of the gear tooth, means comprising an involute rack and gear tooth couple having pitch line rolling contact on the base circle of the gear for guiding the carriage, when the latter is rocked about the axis of the gear being tested, with a combination of rotative and translative movements such that said feeler is moved in a path which is an involute of said base circle, except as it is displaced from such path by aberrations in a tooth face of the gear, and an indicator controlled by lateral movements of the feeler organized to show on an enlarged scale the occurrence and extent of such displacements.

13. A gear measuring machine as set forth in claim 12, in which the rack and gear tooth couple consists of a stationary former having faces which are involute curves of a base circle concentric with and smaller in diameter than the base circle of the gear, and abutments on the carriage flanking said former and corresponding to an involute rack tooth space conjugate to the former on a pitch circle coincident with the base circle of the gear, and the contact point of said feeler is adapted to engage a tooth face of the gear at a point coincident with the pitch line of said abutments.

14. In a gear measuring machine, supporting structure, a former corresponding to the tooth of a gear co-axial with the gear to be tested mounted on the supporting structure, a carriage freely movable on the supporting structure with respect to said former and having abutments corresponding to the faces of rack teeth conjugate to said former in position to embrace the former between them, one of said abutments being adjustable angularly in a manner such as to change the pressure angle of its face relatively to the former.

15. A gear testing machine comprising supporting structure, an arbor adapted to hold the gear to be tested mounted on the supporting structure, a former having opposite involute faces, secured in a prescribed relationship to said arbor, a carrier resting on said supporting structure with freedom for movement bodily thereover, abutments secured to said carriage and having faces corresponding to the sides of a tooth space in an involute rack arranged to embrace said former and engage the involute faces thereof, whereby to constrain the carrier, when moved angularly over said support and held with its abutments in contact with said former, to rock or roll about a pitch circle concentric with the arbor, one of said abutments being angularly adjustable so as to alter the angle included between the faces of the two abutments, a feeler mounted on the carrier in position to engage the side face of a gear tooth suitably mounted on said arbor and having provisions for displacement relatively to the carrier toward and away from the radial center line of such tooth, and means for indicating and measuring the direction and extent of such displacements of the feeler.

16. In a gear measuring machine of the character set forth, a carrier, abutments mounted on said carrier having contact faces bounding an intermediate space, which faces correspond to the adjacent faces of two contiguous rack teeth adapted to engage an intruding gear tooth, said abutments being relatively adjustable to vary the distance between them and to vary the angle included between said faces.

17. In a measuring machine of the character set forth, a structure having a plane supporting surface, a carrier resting on said surface with provision for free movement thereover, a feeler member mounted on said carrier, guiding means for controlling movement imparted manually to said carrier so that such movement is one of rolling about a given pitch circle, complemental index means on the supporting surface and carrier respectively for indicating the angular extent of such movement around the center of said pitch circle, and a zero indicator angularly movable about the same center into register with different ones of the index means on the supporting surface.

18. In a measuring machine of the character set forth, a structure having a plane supporting surface, a carrier resting on said surface with provision for free movement thereover, a feeler member mounted on said carrier, guiding means for controlling movement imparted manually to said carrier so that such movement is one of rolling about a given pitch circle, graduations on the supporting surface radial to the center of such pitch circle, a complemental index on the carrier arranged to cooperate in indicating and measuring the angular movement of the carrier, and a zero indicator adjustable angularly about the same center into register with different ones of said graduations.

19. In a measuring machine of the character set forth, a stationary frame structure, a spindle mounted in and movable axially with respect to said frame structure, adapted to hold a test specimen, indicating means supported by said frame structure and movable angularly about said spindle, abutments on the frame structure and spindle respectively, arranged in alinement parallel to the movements of the spindle so that one abutment is moved toward and away from the other with such movements of the spindle, and a gauge block removably located between said abutments to establish a definite distance between them.

20. In a measuring machine of the character set forth, a stationary frame structure, a spindle mounted in and movable axially with respect to said frame structure, adapted to hold a test specimen, a feeler point and means for supporting the same on the frame structure with provision for angular movement about the axis of said spindle, alined abutments on the spindle and frame structure respectively, and a gauge block removably located between said abutments.

21. In a measuring machine of the character set forth, a frame structure, a longitudinally movable spindle in said frame structure, adapted to hold a test specimen, abutments situated respectively on the frame structure and spindle and located in an alinement conforming generally with the direction of movement of the spindle, whereby they are movable together or apart with movement of the spindle, a gauge block, and a gauge block carrier to which said block is secured, mounted adjacent to the said abutments and shiftable to place the gauge block in distance-limiting position between said abutments.

22. In a measuring machine as set forth in claim 21, the gauge block carrier comprising a rotatable shaft and a yieldable support for said shaft arranged to permit unconstrained location and contact of said gauge block between and with the abutments.

23. In a measuring machine as set forth in claim 21, the gauge block carrier comprising a shaft rotatably mounted beside and parallel to the work spindle, and from which the gauge block protrudes radially in position to pass between the abutments when said carrier is rotated, and a yieldable support for said carrier organized to hold the same so that the gauge block is normally clear of the frame abutment, but yieldable to permit unconstrained engagement of the block with said abutment when pressed upon by the spindle abutment.

24. A measuring machine comprising a stationary frame structure, a spindle supported by said structure and movable axially, adapted to hold a test specimen, a carriage movable on said frame structure translatively and angularly around the axis of the spindle, a former having faces similar to those of a gear to be tested, different zones of such faces being located in planes perpendicular to the axis of the spindle and axially separated from one another by a prescribed distance, and said zones being also angularly displaced from one another about the axis of the spindle by an angle equal to the prescribed angular lead in an equal axial length of a helical gear to be tested, conjugate abutments on the carriage engageable with said different zones of the former upon axial displacement of the spindle, and a feeler on said carriage adapted to engage the tooth face of a helical gear mounted on the spindle coaxially with the former, whereby to test the accuracy of form and helical lead of such tooth face.

25. A measuring machine comprising a frame structure, a spindle mounted in said structure and being movable axially with respect thereto having means for holding a helical gear to be tested, a plurality of formers secured to said spindle coaxially with the gear, having faces similar to those of the gear teeth and being displaced angularly from one another about the axis of the gear to a degree equal to the angular lead of a prescribed helical gear in an axial length of the gear corresponding to the axial distance apart of corresponding zones in the formers, a carriage supported on said frame structure with freedom for translative and bodily movement, abutment members on the carriage conjugate to said formers adapted to embrace and engage either former according as the spindle is placed in different positions axially displaced from one another, and a feeler mounted on the carriage to engage the tooth faces of such gear and indicate aberrations in the form and helical lead of such faces.

26. A measuring machine adapted to test the tooth forms and helical lead of helical gears comprising a frame structure, a spindle supported by said structure and movable endwise relatively thereto having means for holding a helical gear with its axis coinciding with the direction of such movement, a former secured to the spindle coaxially with the gear and having faces of similar form and identical helical lead with the intended form and lead of the gear to be tested, a carriage supported by said frame structure with provision for free angular and translative movement with respect to the former, abutment members secured to said carriage in position to flank the former and having contact faces corresponding to those of a helical rack tooth space conjugate to the former, and a feeler mounted on the carriage engageable with a tooth face of the gear to be tested for showing aberrations therein from correct form and helical lead.

27. In a measuring machine, a frame structure, a spindle in said frame structure movable lengthwise relatively thereto, adapted to hold a test specimen, means for measuring the axial displacement of said spindle comprising abutments on the frame structure and spindle respectively and a gauge block located removably between said abutments, a turntable rotatable on the frame structure, and means for measuring angular displacement of said turntable comprising stops mounted on the turntable and frame structure respectively and gauge blocks removably interposed between said stops.

28. In a measuring machine, a frame structure, a spindle in said frame structure movable lengthwise relatively thereto, adapted to hold a test specimen, a turntable rotatable on the frame structure, means on the work spindle for securing a work piece having a helical face, with the axis of such face in alinement with the axis of rotation of the turntable, and means for measuring angular displacement of the table comprising stops mounted on the frame structure and table respectively, and gauge blocks between said stops.

29. In a measuring machine of the character set forth, a frame structure, a turntable rotatably mounted on said structure, complemental stops secured respectively to the frame structure and table for limiting rotation of the table in one direction, a shiftable stop for limiting movement of the table in the opposite direction, attachable to the frame structure in different positions across the path of the table-carried stop, and means comprising gauge blocks removably located between said shiftable stop and one of the other stops for determining a desired location of the shiftable stop.

30. In a measuring machine of the character set forth, a frame structure, a turntable rotatably mounted on said structure, a stop carried by said turntable, complemental stops on the frame structure located at opposite sides of the table-carried stop for establishing opposite limits to angular movement of the table, one of said limit stops being relatively fixed and the other relatively shiftable, and displaceable gauge blocks between the table-carried stop and one of the limit stops for determining the location of the adjustable stop.

31. In a measuring machine of the character set forth, a frame structure, a turntable rotatably mounted on said structure and having a series of notches spaced apart from one another by a prescribed number of angular degrees, a lock engageable with any of said notches for positioning the table, a stop carried by the table, a stop adjustably mounted on the frame structure, and means for locating the latter stop at an angular distance from the first stop less than the angle between adjacent notches, comprising gauge blocks adapted to be interposed between the two stops and having a total thickness equal to the sine of such angle multiplied by the radial distance of the first stop from the rotational axis of the table.

32. A measuring machine of the character set forth comprising a stationary frame structure with a plane top supporting surface, indicating means supported by said top surface, a spindle having an element protruding from said surface adapted to hold a test specimen, and adjusting means in shiftable acting and reacting engagement with the spindle and frame structure, respectively, for changing the angle between said protruding element and the plane of said supporting surface.

33. A measuring machine of the character set forth comprising a stationary frame structure with a plane top supporting surface, indicating means supported by said top surface, a spindle having an element protruding from said surface adapted to hold a test specimen, and means for adjusting said spindle about intersecting axes parallel with said supporting surface in order to bring the protruding element of the spindle perpendicular to the surface.

34. In a measuring machine of the character set forth, a supporting structure having a plane upper surface, an endwise movable spindle arranged and movable perpendicular to said surface, an arbor for holding test specimens supported on said spindle with a ball and socket engagement and having an extension protruding within the spindle, and adjusting means engaged reactively with the spindle and said extension for adjusting the arbor on said ball and socket engagement about a plurality of axes transverse to the axis of the arbor and to one another.

35. In a measuring machine of the character described, a supporting structure having longitudinally separated bearings, a spindle for holding specimens to be tested mounted with provision for movement endwise in said bearings, one of the bearings being comprised by separate members engaging different sides of the spindle and being adjustable independently of one another in directions transverse to the spindle.

36. In a measuring machine of the character set forth, a supporting structure, a spindle mounted and guided in said structure for endwise adjusting movement, an arbor carried by said spindle for holding test specimens and having a ball and socket type engagement with the spindle to permit adjustment of its axis into coincidence with the line of travel of the spindle, and adjusting means reactively engaged between the spindle and arbor for effecting such adjustments.

37. In a measuring machine of the character set forth, a supporting structure, a spindle mounted and guided in said structure for endwise adjusting movement, an arbor carried by said spindle for holding test specimens and having a ball and socket type engagement with the spindle to permit adjustment of its axis into coincidence with the line of travel of the spindle, said arbor having an extension protruding within the spindle and separated at all sides therefrom, and independently adjustable screws threaded through different sides of the spindle into engagement with said extension for effecting such adjustments of the arbor.

38. A measuring machine of the character set forth, comprising a supporting structure, a turntable rotatably mounted on said structure, a spindle mounted in said structure and having a projecting arbor for carrying articles to be tested, adjusting means cooperating with the supporting structure and the arbor for rectifying the arbor with respect to the plane of rotation of the table, and bearing means for the table adjustable to bring its axis of rotation into coincidence with the axis of the rectified arbor.

39. A measuring machine of the character described comprising a supporting structure, a spindle mounted in said structure and having means for holding specimens to be tested, a turntable surrounding said spindle, and bearing elements on the supporting structure engaging the table laterally at points spaced apart around the spindle and being adjustable radially of the spindle to center the table with respect to the spindle.

40. In a measuring instrument, a supporting structure, an arbor having a substantially spherical seating portion in supporting engagement with a cooperating seat on the supporting structure, and having a depending extension below said seating portion, and adjusting means engaging said extension on different sides thereof in reacting connection with the supporting structure, with provision for movement independently of one another transversely to the extension, whereby to position the extension and arbor at a desired angle to the plane of the horizon.

EDWARD W. MILLER.